US012743118B2

(12) United States Patent
Ogura

(10) Patent No.: US 12,743,118 B2
(45) Date of Patent: Sep. 22, 2026

(54) VOLTAGE REGULATOR AND SEMICONDUCTOR DEVICE

(71) Applicant: ABLIC Inc., Nagano (JP)

(72) Inventor: Yasuhiko Ogura, Nagano (JP)

(73) Assignee: ABLIC Inc., Nagano (JP)

( * ) Notice: Subject to any disclaimer, the term of this patent is extended or adjusted under 35 U.S.C. 154(b) by 107 days.

(21) Appl. No.: 19/023,144

(22) Filed: Jan. 15, 2025

(65) Prior Publication Data

US 2025/0306619 A1 Oct. 2, 2025

(30) Foreign Application Priority Data

Mar. 26, 2024 (JP) ................................ 2024-049618
Sep. 30, 2024 (JP) ................................ 2024-170766

(51) Int. Cl.
*G05F 1/575* (2006.01)
*G05F 1/567* (2006.01)
*G05F 3/26* (2006.01)

(52) U.S. Cl.
CPC .............. *G05F 1/575* (2013.01); *G05F 1/567* (2013.01); *G05F 3/262* (2013.01)

(58) Field of Classification Search
CPC ........... G05F 1/567; G05F 1/575; G05F 3/262
See application file for complete search history.

(56) References Cited

U.S. PATENT DOCUMENTS 7,245,115 B2 * 7/2007 Chilcote ................ G05F 1/575 323/272
10,908,626 B2 2/2021 Nagata et al.
2007/0018621 A1 * 1/2007 Mok ...................... G05F 1/575 323/280
2008/0157735 A1 * 7/2008 Liu ........................ G05F 1/575 323/280
2008/0284394 A1 * 11/2008 Yin ........................ G05F 1/575 327/537
2011/0025280 A1 * 2/2011 Kimura .................. G05F 1/575 330/252

FOREIGN PATENT DOCUMENTS

JP 2020071681 5/2020

* cited by examiner

*Primary Examiner* — Jue Zhang
(74) *Attorney, Agent, or Firm* — JCIPRNET

(57) ABSTRACT

A voltage regulator includes a differential amplifier circuit that controls an output transistor, and a phase compensation circuit. The phase compensation circuit includes: a first transistor having a drain connected to an output port of the differential amplifier circuit, and having a drain-source current with a negative temperature characteristic; a second transistor having a drain connected to a gate of the first transistor, having a gate connected to the gate of the first transistor via a resistor, and having a drain-source current with a negative temperature characteristic; and a current mirror circuit that includes a voltage detection transistor for detecting a voltage input to the gate of the output transistor, and that supplies a current with a positive temperature characteristic in response to a current flowing in the voltage detection transistor.

12 Claims, 8 Drawing Sheets

VOLTAGE REGULATOR AND SEMICONDUCTOR DEVICE

CROSS-REFERENCE TO RELATED APPLICATION

This application claims the priority benefits of Japanese application no. 2024-049618, filed on Mar. 26, 2024, and Japanese application no. 2024-170766, filed on Sep. 30, 2024. The entirety of the above-mentioned patent application is hereby incorporated by reference herein and made a part of this specification.

BACKGROUND

Technical Field

The present invention relates to a voltage regulator and a semiconductor device.

Related Art

Conventionally, voltage regulators capable of outputting a constant voltage lower than an input voltage are widely used as integrated circuits (ICs) for power supply in electronic devices. Such voltage regulators have a phase compensation function that can suppress oscillation.

According to the conventional technology, the response characteristics and phase margin of the voltage regulator in the case of fluctuations in the load and power supply had negative temperature characteristics. In other words, in response to fluctuations in the load and power supply, the voltage regulator related to the conventional technology may experience deterioration in response characteristics and phase margin according to the temperature characteristics of the phase compensation circuit and the temperature characteristics of the bias circuit for the phase compensation circuit.

The present invention, in consideration of such circumstances, aims to provide a voltage regulator and a semiconductor device capable of suppressing the deterioration of response characteristics and phase margin due to temperature dependence in the case of fluctuations in the load and power supply of the voltage regulator.

SUMMARY

A voltage regulator according to one aspect of the present invention includes a differential amplifier circuit that amplifies and outputs a difference between a reference voltage and a divided voltage obtained by dividing a voltage output by an output transistor, and controls a gate of the output transistor, and a phase compensation circuit. The phase compensation circuit includes: a first transistor having a drain connected to an output port of the differential amplifier circuit, and having a drain-source current with a negative temperature characteristic due to temperature characteristics of carrier mobility; a second transistor having a drain connected to a gate of the first transistor, and having a gate connected to the gate of the first transistor via a resistor, and having a drain-source current with a negative temperature characteristic due to the temperature characteristics of carrier mobility; and a current mirror that includes a voltage detection transistor for detecting a voltage input to the gate of the output transistor, and that supplies a current with a positive temperature characteristic to the drain of the first transistor and the drain of the second transistor in response to a current flowing in the voltage detection transistor.

Effects

According to the present invention, it is possible to provide a voltage regulator and a semiconductor device capable of suppressing the deterioration of response characteristics and phase margin due to temperature dependence in the case of fluctuations in the load and power supply of the voltage regulator.

DESCRIPTION OF THE EMBODIMENTS

Embodiments

In the following, preferred embodiments of the voltage regulator according to an aspect of the present invention will be described in detail with reference to the accompanying drawings.

First Embodiment

Figure 1:
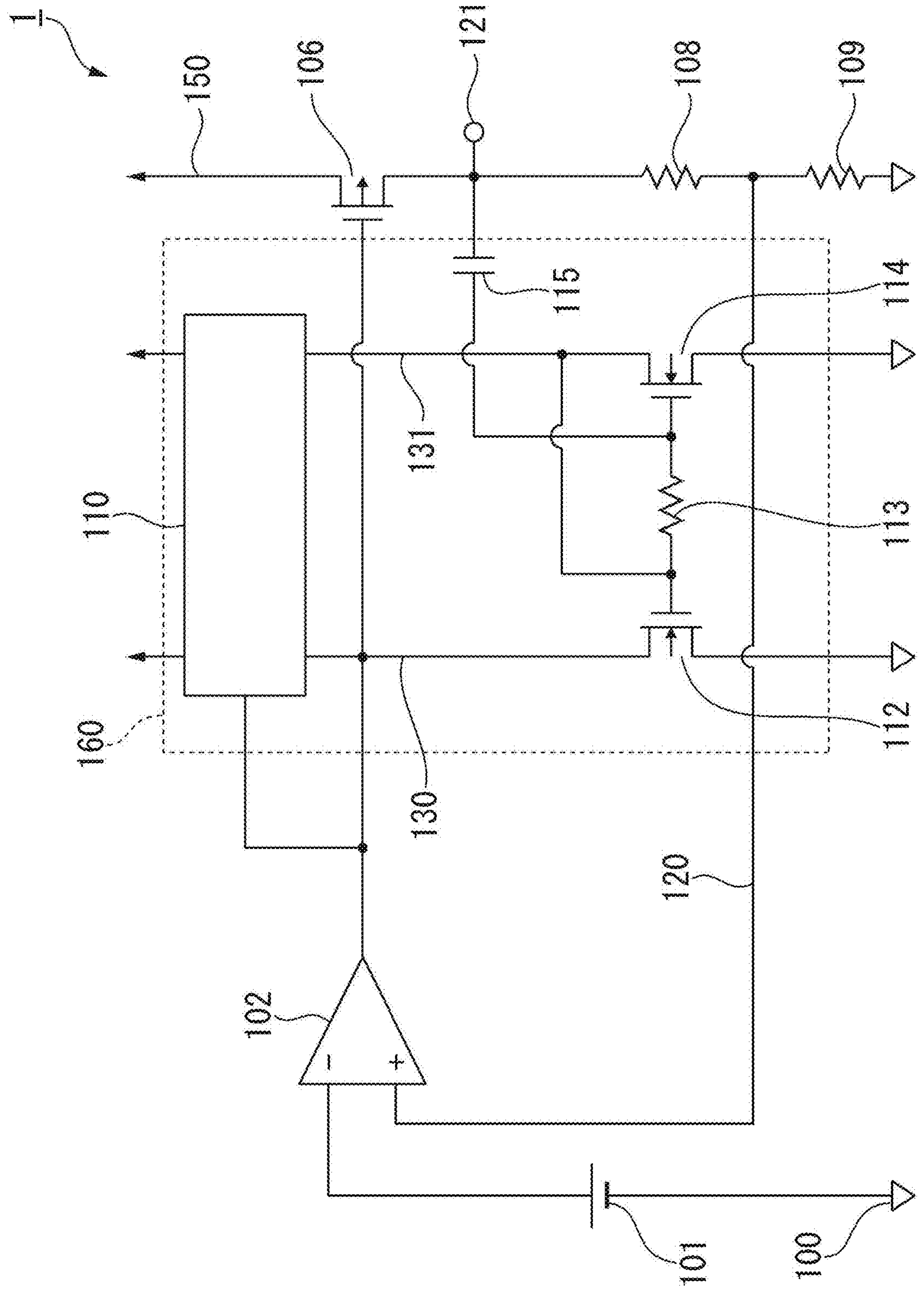
FIG. 1 is a circuit diagram showing a voltage regulator according to the first embodiment.

FIG. 1 is a circuit diagram showing a voltage regulator according to the first embodiment. First, a voltage regulator 1 will be described with reference to this figure. The voltage regulator 1 includes a reference voltage circuit 101, a differential amplifier circuit 102, a phase compensation circuit 160, a PMOS transistor 106, a resistor 108, a resistor 109, a ground terminal 100, an output port 121, and a power terminal 150.

It should be noted that not all elements included in the voltage regulator 1 need to be provided inside a single integrated circuit, and some elements (for example, resistor 108 and resistor 109, etc.) may exist outside the IC.

Also, there are places where the reference numbers for the ground terminal 100 and the power terminal 150 are omitted, but when the symbols indicating each terminal are the same, they represent the ground terminal 100 and the power terminal 150, respectively.

Furthermore, in the following description, the PMOS transistor 106 may be referred to as the output transistor.

The voltage regulator 1 generates a constant voltage lower than an input voltage based on the input voltage applied between the ground terminal 100 and the power terminal 150, and outputs it to the output port 121. A predetermined load resistor and load capacitance (not shown) are connected to the output port 121. The voltage regulator 1 has a phase compensation function to respond to changes in input voltage and output current. In the following, an example where a load resistor is connected to the output port 121 will be described.

The differential amplifier circuit 102 includes an inverting input port, a non-inverting input port, and an output port. Moreover, the differential amplifier circuit 102 also includes a positive power terminal and a negative power terminal (not shown). The inverting input port is connected to the reference voltage circuit 101. The non-inverting input port is connected to the connection point 120 of the resistor 108 and the resistor 109. The output port is connected to a gate terminal of the PMOS transistor 106. The differential amplifier circuit 102 amplifies and outputs the difference between a divided voltage (i.e., the voltage at the connection point 120 of the resistor 108 and the resistor 109) obtained by dividing the voltage output by the PMOS transistor 106 and an output voltage VREF of the reference voltage circuit 101, and controls the gate of the PMOS transistor 106.

The phase compensation circuit 160 provides a phase compensation function. The phase compensation circuit 160 includes a current mirror circuit 110, an NMOS transistor 112, a resistor 113, an NMOS transistor 114, and a capacitance 115. The NMOS transistor 112 has its drain connected to the output port of the differential amplifier circuit 102, its source connected to the ground terminal 100, and its gate connected to one end of the resistor 113 and the drain of the NMOS transistor 114. The NMOS transistor 114 has its drain connected to the current mirror circuit 110, its source connected to the ground terminal 100, and its gate connected to the other end of the resistor 113 and one end of the capacitance 115. The other end of the capacitance 115 is connected to the output port 121 and the drain of the PMOS transistor 106.

It should be noted that in the following description, the NMOS transistor 112 may be referred to as the first transistor, and the NMOS transistor 114 may be referred to as the second transistor.

The current mirror circuit 110 is connected between the power terminal 150, the output port of the differential amplifier circuit 102 (i.e., node 130), and a node 131. The current mirror circuit 110 outputs a predetermined current to the node 130 and the node 131 in response to the output voltage of the differential amplifier circuit 102.

Figure 2:
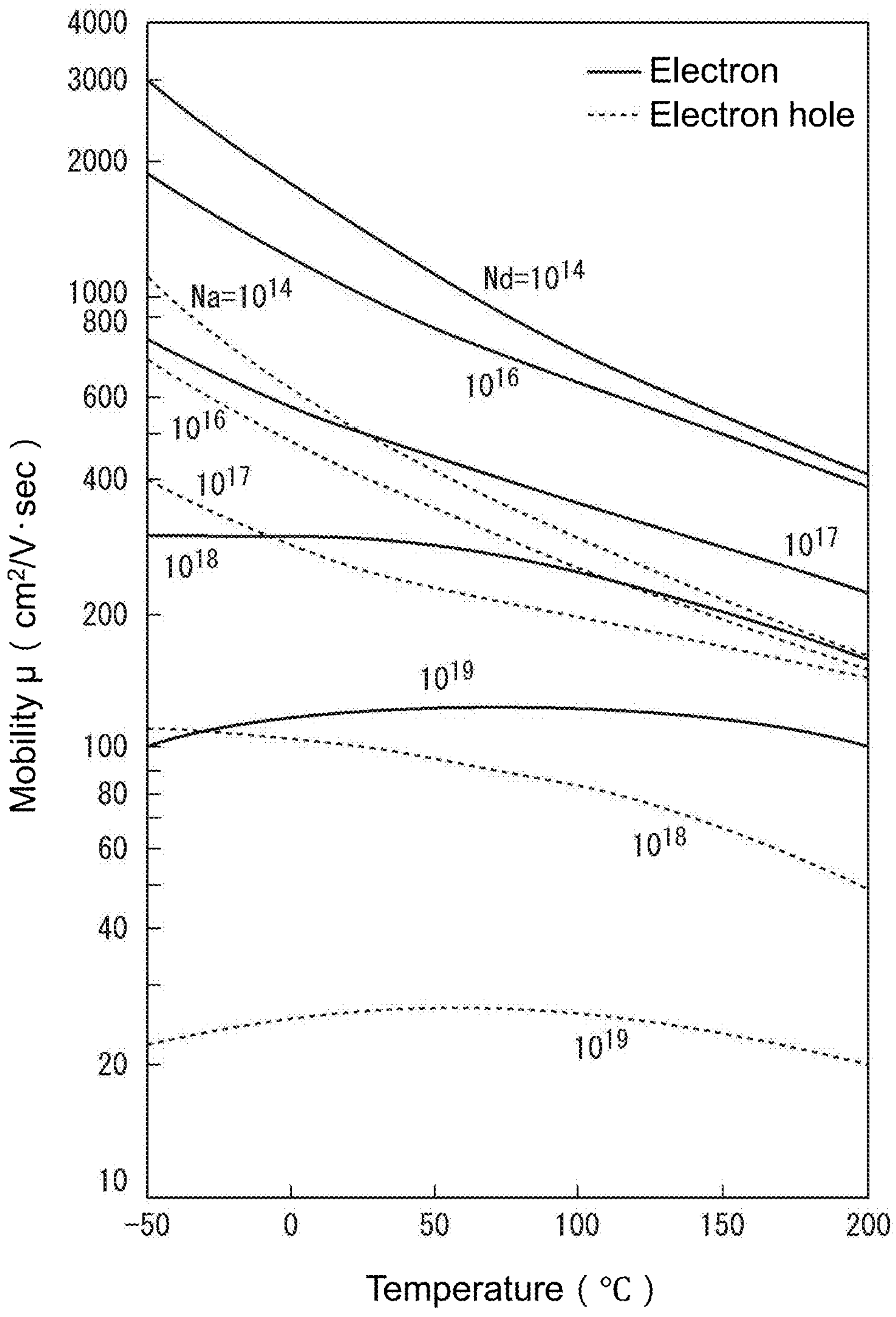
FIG. 2 is a graph showing the temperature characteristics of mobility according to the first embodiment.

FIG. 2 is a graph showing the temperature characteristics of mobility according to the first embodiment. The horizontal axis of this figure indicates temperature [° C.], and the vertical axis indicates mobility μ[cm2/V·sec] on a logarithmic scale. In this figure, the temperature characteristics of electrons are shown by a solid line, and the temperature characteristics of electron hole are shown by a dashed line. Additionally, this figure shows multiple examples for cases where a concentration Na of P-type impurity ranges from $10^{14}$ to $10^{19}$. Similarly, this figure shows multiple examples for cases where a concentration Nd of N-type impurity ranges from 1014 to 1019.

It should be noted that in the following description, the temperature characteristics of mobility for electrons and electron holes (i.e., carriers) may be referred to as carrier mobility temperature characteristics without distinction.

As shown in the figure, carriers have a characteristic where mobility u increases as temperature decreases. In the case of low impurity concentration, especially due to significant lattice scattering, it may be observed that the change in mobility u is highly dependent on temperature. On the other hand, in the case of high impurity concentration, due to significant impurity scattering, it may be seen that the change in mobility u is less dependent on temperature. Thus, since carriers generally have increased mobility u as temperature decreases, it may be said that carrier mobility temperature characteristics typically possess a negative temperature characteristic.

Therefore, since the drain current flowing between drain-source in a transistor is proportional to the mobility u, it may be said that the current flowing between the drain-source possesses a negative temperature characteristic.

Figure 3:
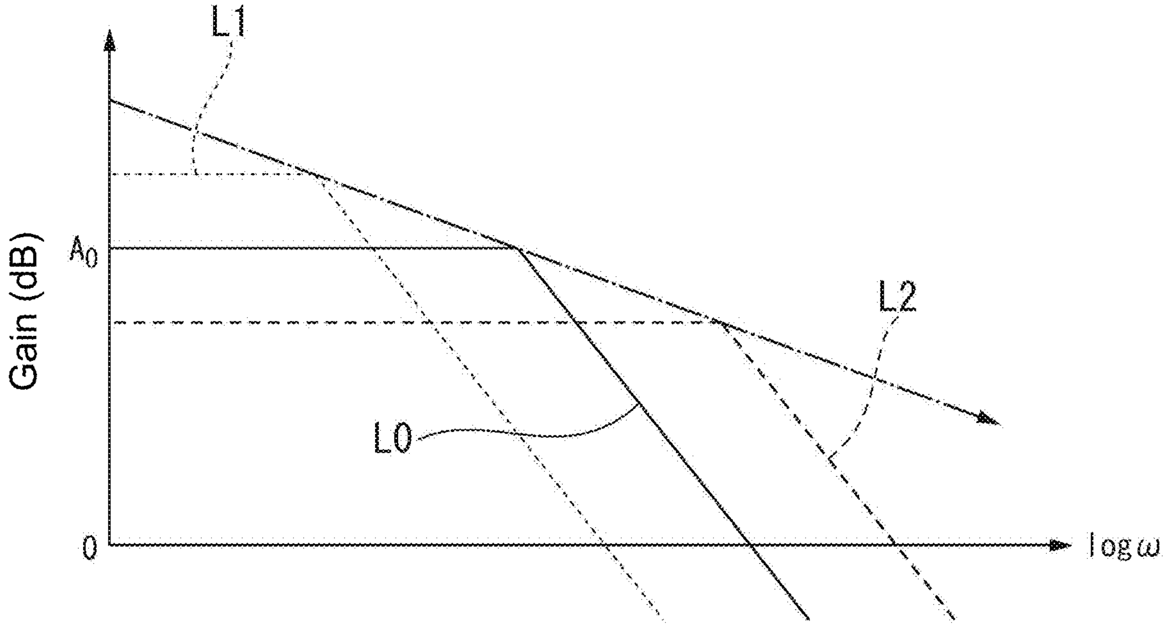
FIG. 3 is a graph for describing the gain-frequency characteristics by current in the transistor according to the first embodiment.

FIG. 3 is a graph for describing the gain-frequency characteristics by current in a transistor according to the first embodiment. Referring to this figure, the gain-frequency characteristics by current in a transistor will be described and the case when the drain current decreases will be described. The horizontal axis of this figure shows frequency on a logarithmic scale, and the vertical axis shows gain. Moreover, in this figure, the gain-frequency characteristics at room temperature are shown as L0 with a solid line, the gain-frequency characteristics when the drain current is less likely to flow at high temperature are shown as L1 with a dashed line (thin line), and the gain-frequency characteristics when the drain current is more likely to flow at low temperature are shown as L2 with a dashed line (thick line).

As shown in FIG. 2, since the current flowing between the drain-source possesses a negative temperature characteristic, in the case that the current decreases at high temperature, the gain-frequency characteristics in the high-frequency domain deteriorate as shown in FIG. 3, and a gain A0 in the low-frequency domain increases. Moreover, in the case that the current increases at low temperature, the gain-frequency characteristics in the high-frequency domain improve, and the gain A0 in the low-frequency domain decreases. In other words, in the case where the drain current decreases, it may be generally said that the frequency characteristics worsen.

Therefore, since the gain-frequency characteristics of the transistor deteriorate at high temperature, the gain-frequency characteristics of the phase compensation circuit 160 also deteriorate, and the response characteristics and phase margin in response to variations in the load and power supply deteriorate depending on temperature.

Returning to FIG. 1, according to this embodiment, the current mirror circuit 110 supplies a current with a positive temperature characteristic to the drain of the NMOS transistor 112 and the drain of the NMOS transistor 114. By supplying a current with a positive temperature characteristic, the current mirror circuit 110 may increase the current flowing into the drain of the NMOS transistor 112 and the current flowing into the drain of the NMOS transistor 114 at high temperature. Therefore, while each transistor in the voltage regulator 1 has a current with a negative temperature characteristic, according to this embodiment, the current mirror circuit 110 supplies a current with a positive temperature characteristic. As a result, it is possible to suppress the deterioration of response characteristics and phase margin that depend on temperature in response to variations in the load and power supply of the voltage regulator 1.

Next, referring to FIG. 4 to FIG. 8, the specific methods for supplying a current with a positive temperature characteristic and application examples, etc. of the voltage regulator 1 according to this embodiment will be described in detail.

Second Embodiment

Figure 4:
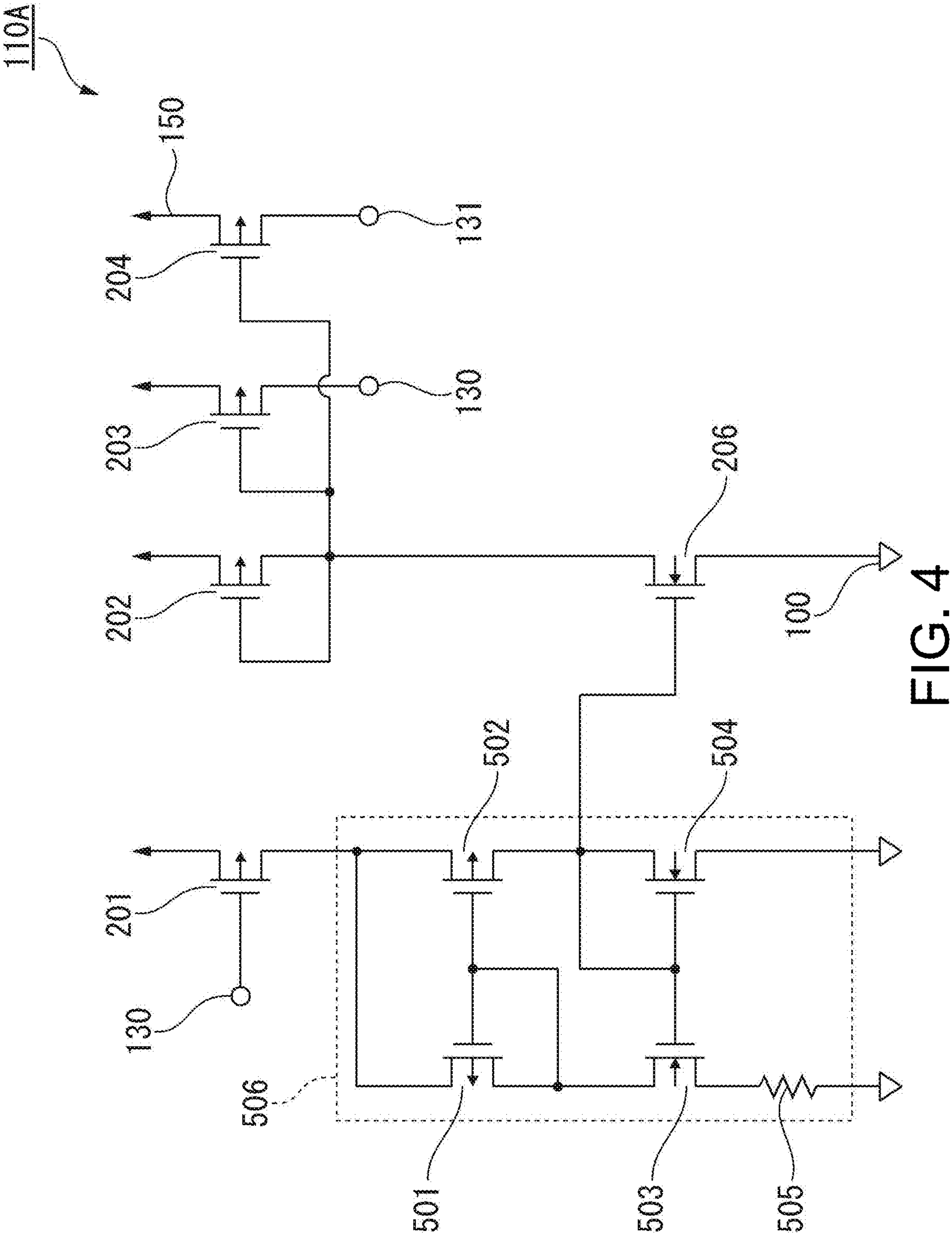
FIG. 4 is a circuit diagram showing a voltage regulator according to the second embodiment.

FIG. 4 is a circuit diagram showing a voltage regulator according to the second embodiment. Referring to this figure, a current mirror circuit 110A, which is a specific aspect of the current mirror circuit 110 according to the first embodiment, included in a voltage regulator 1A according to the second embodiment will be described. The current mirror circuit 110A includes a PMOS transistor 201, a PMOS transistor 202, a PMOS transistor 203, a PMOS transistor 204, a constant current source circuit 506, and an NMOS transistor 206.

The PMOS transistor 201 has its source connected to the power terminal 150, its gate connected to the node 130, which is the output of the differential amplifier circuit 102 shown in FIG. 1, and its drain connected to the constant current source circuit 506. The constant current source circuit 506 has one end connected to the drain of the PMOS transistor 201 and the other end connected to the ground terminal 100. The NMOS transistor 206 has its source connected to the ground terminal 100 and its drain connected to the drain of the PMOS transistor 202. The source of the PMOS transistor 202 is connected to the power terminal 150, and its gate is connected to the drain of the PMOS transistor 202, the gate of the PMOS transistor 203, and the gate of the PMOS transistor 204. The PMOS transistor 203 has its source connected to the power terminal 150 and its drain connected to the node 130 (i.e., the drain of the NMOS transistor 112 of the phase compensation circuit 160). The source of the PMOS transistor 204 is connected to the power terminal 150, and its drain is connected to the node 131 (i.e., the drain of the NMOS transistor 114 of the phase compensation circuit 160).

The constant current source circuit 506 includes a PMOS transistor 501, a PMOS transistor 502, an NMOS transistor 503, an NMOS transistor 504, and a resistor 505. In the following description, the PMOS transistor 501 may be referred to as the third transistor, the PMOS transistor 502 as the fourth transistor, the NMOS transistor 504 as the fifth transistor, the NMOS transistor 503 as the sixth transistor, and the resistor 505 as the first resistor.

The PMOS transistor 501 has its source connected to the drain of the PMOS transistor 201, its gate connected to the drain of the PMOS transistor 501, and its drain connected to the drain of the NMOS transistor 503. The PMOS transistor 502 has its source connected to the drain of the PMOS transistor 201, its gate connected to the drain of the PMOS transistor 501, and its drain connected to the drain of the NMOS transistor 504. The NMOS transistor 503 has its gate connected to the drain of the NMOS transistor 504, and its source connected to one end of the resistor 505. The NMOS transistor 504 has its gate connected to the drain of the NMOS transistor 504, and its source connected to the ground terminal 100. The other end of the resistor 505 is connected to the ground terminal 100.

In the current mirror circuit 110A, the gate voltage of the PMOS transistor 106, which is the output of the differential amplifier circuit 102 shown in FIG. 1, is input to the gate of the PMOS transistor 201. The drain current of the PMOS transistor 201 varies according to the current value that the PMOS transistor 106 flows to the load resistor. The drain current of the PMOS transistor 201 is mirrored (replicated) to the PMOS transistor 202. Furthermore, the drain current of the PMOS transistor 201 is mirrored to the phase compensation circuit 160 by the PMOS transistor 202, the PMOS transistor 203, and the PMOS transistor 204. In other words, a current corresponding to the current value that the PMOS transistor 106 flows to the load resistor flows to the node 130 and the node 131.

Here, the PMOS transistor 501 and the PMOS transistor 502 constitute a current mirror circuit. The NMOS transistor 503 and the NMOS transistor 504 constitute a current mirror circuit with their gates connected to each other, but the source of the NMOS transistor 503 is connected to the ground terminal 100 through a resistor. Therefore, a voltage drop occurs in the resistor 505 due to the drain current of the NMOS transistor 503, and the gate-source voltage of the NMOS transistor 503 decreases by that amount. The voltage drop in the resistor 505 is determined by the difference in K values between the NMOS transistor 503 and the NMOS transistor 504, or the difference in K values between the PMOS transistor 501 and the PMOS transistor 502, and the value of the resistor 505. Consequently, the constant current source circuit 506 operates as a constant current source circuit that is independent of the power supply voltage.

At the point where the load current value flowing through the PMOS transistor 106, which is referenced by the PMOS transistor 201, exceeds a certain value, the constant current source circuit 506 operates as a constant current circuit and limits the drive current value of the phase compensation circuit 160. By limiting the drive current value of the phase compensation circuit 160, no offset is generated in the transistor of an input stage of the differential amplifier circuit 102, and it becomes possible to set the output voltage accurately without variations in the output voltage due to offset. Furthermore, according to the magnitude of the current that the PMOS transistor 106 flows to the load resistor, the consumption current of the phase compensation circuit 160 may be kept low, and in the case where the current value that the PMOS transistor 106 flows to the load resistor is large, the drive current of the phase compensation circuit 160 may be limited so as not to become excessive.

Here, the resistor 505 has a negative temperature characteristic. By having the resistor 505 with a negative temperature characteristic, the current mirror circuit 110A may supply a current with a positive temperature characteristic to the node 130 and the node 131. By supplying a current with a positive temperature characteristic, the current mirror circuit 110A may increase the current flowing into the drain of the NMOS transistor 112 and the current flowing into the drain of the NMOS transistor 114 at high temperature. Therefore, according to this embodiment, it is possible to suppress the deterioration of the response characteristics and phase margin of the voltage regulator 1 due to temperature dependence in the case of fluctuations in the load and power supply.

Third Embodiment

Figure 5:
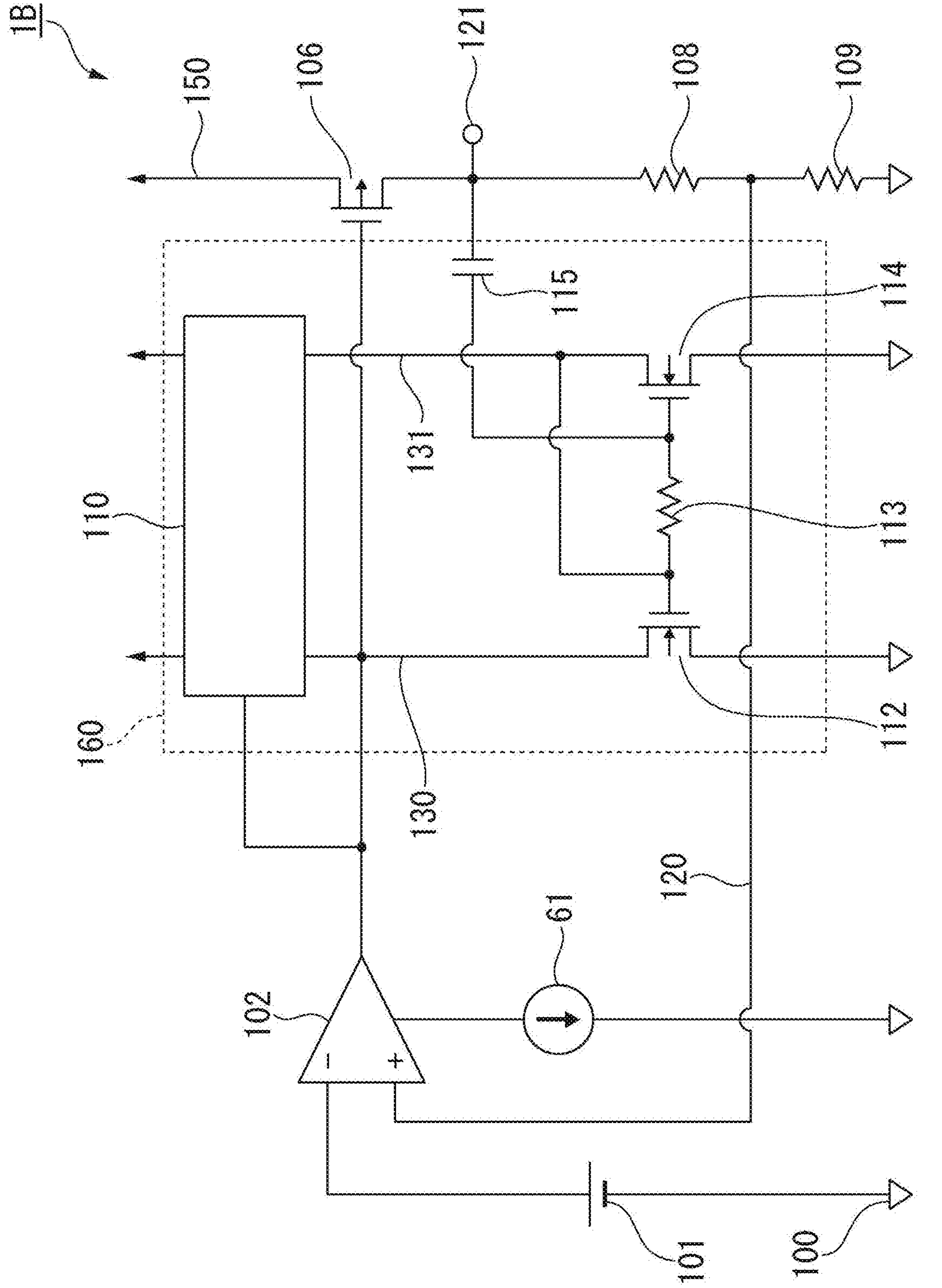
FIG. 5 is a circuit diagram showing a voltage regulator according to the third embodiment.

FIG. 5 is a circuit diagram showing a voltage regulator according to the third embodiment. Referring to this figure, an example of a voltage regulator 1B according to the third embodiment will be described. The voltage regulator 1B is different from Embodiment 1 in that it further includes a bias current source 61 with positive temperature characteristics. The bias current source 61 is configured in the differential amplifier circuit 102. In the example shown in the figure, the differential amplifier circuit 102 includes a grounded negative power terminal, and the negative power terminal flows a current with a positive temperature characteristic to the ground point. As a specific aspect of the bias current source 61, known technology may be used. By further applying the bias current source 61 with a positive temperature characteristic to the differential amplifier circuit 102, it is possible to further suppress the temperature deterioration of the load response characteristics. Therefore, according to this embodiment, is possible to suppress the deterioration of the response characteristics and phase margin of the voltage regulator 1 due to temperature dependence in the case of fluctuations in the load and power supply.

Fourth Embodiment

Figure 6:
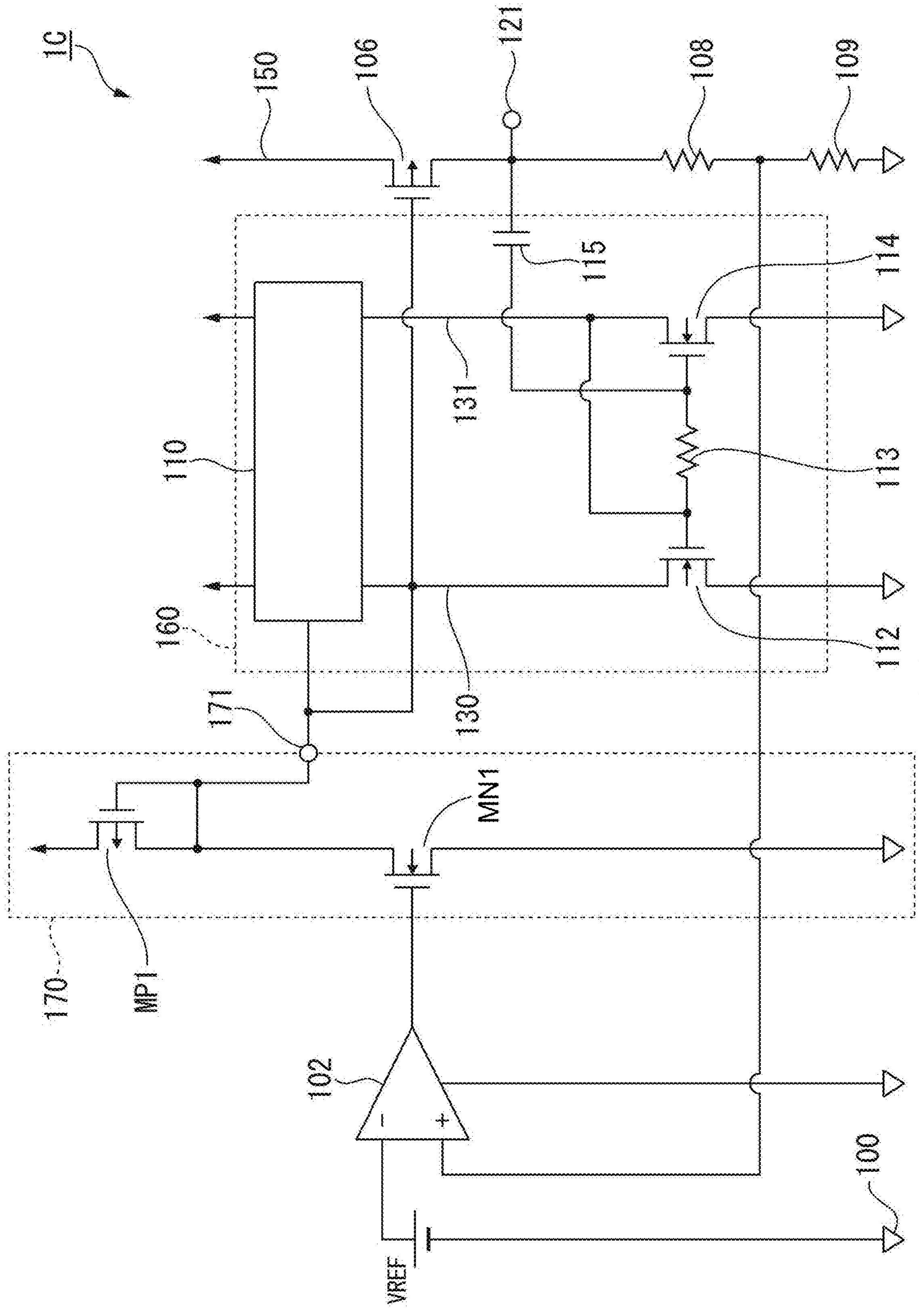
FIG. 6 is a circuit diagram showing a voltage regulator according to the fourth embodiment.

FIG. 6 is a circuit diagram showing a voltage regulator according to the fourth embodiment. Referring to this figure, an example of a voltage regulator 1C according to the fourth embodiment will be described. The voltage regulator 1C differs from the first embodiment in that it further includes an inverting amplifier 170. In the description of the voltage regulator 1C, the configuration already described may be omitted by assigning the same reference numerals as those of the voltage regulator 1.

The inverting amplifier 170 is connected between the differential amplifier circuit 102 and the PMOS transistor 106. An output port 171 of the inverting amplifier 170 is connected to the drain of the NMOS transistor 112 and the gate of the PMOS transistor 106.

The inverting amplifier 170 includes a PMOS transistor MP1 and an NMOS transistor MN1. The PMOS transistor MP1 has its source connected to the power terminal 150, and its drain and gate connected to each other. The drain and gate of the PMOS transistor MP1 are connected to the output port 171. The NMOS transistor MN1 has its drain connected to the drain and gate of the PMOS transistor MP1, its gate connected to the output port of the differential amplifier circuit 102, and its source connected to the ground terminal 100.

In this manner, according to this embodiment, even the voltage regulator 1C that includes the inverting amplifier 170 may be applied, and it is possible to suppress the deterioration of the response characteristics and phase margin of the voltage regulator 1C due to temperature dependence in the case of fluctuations in the load and power supply.

Fifth Embodiment

Figure 7:
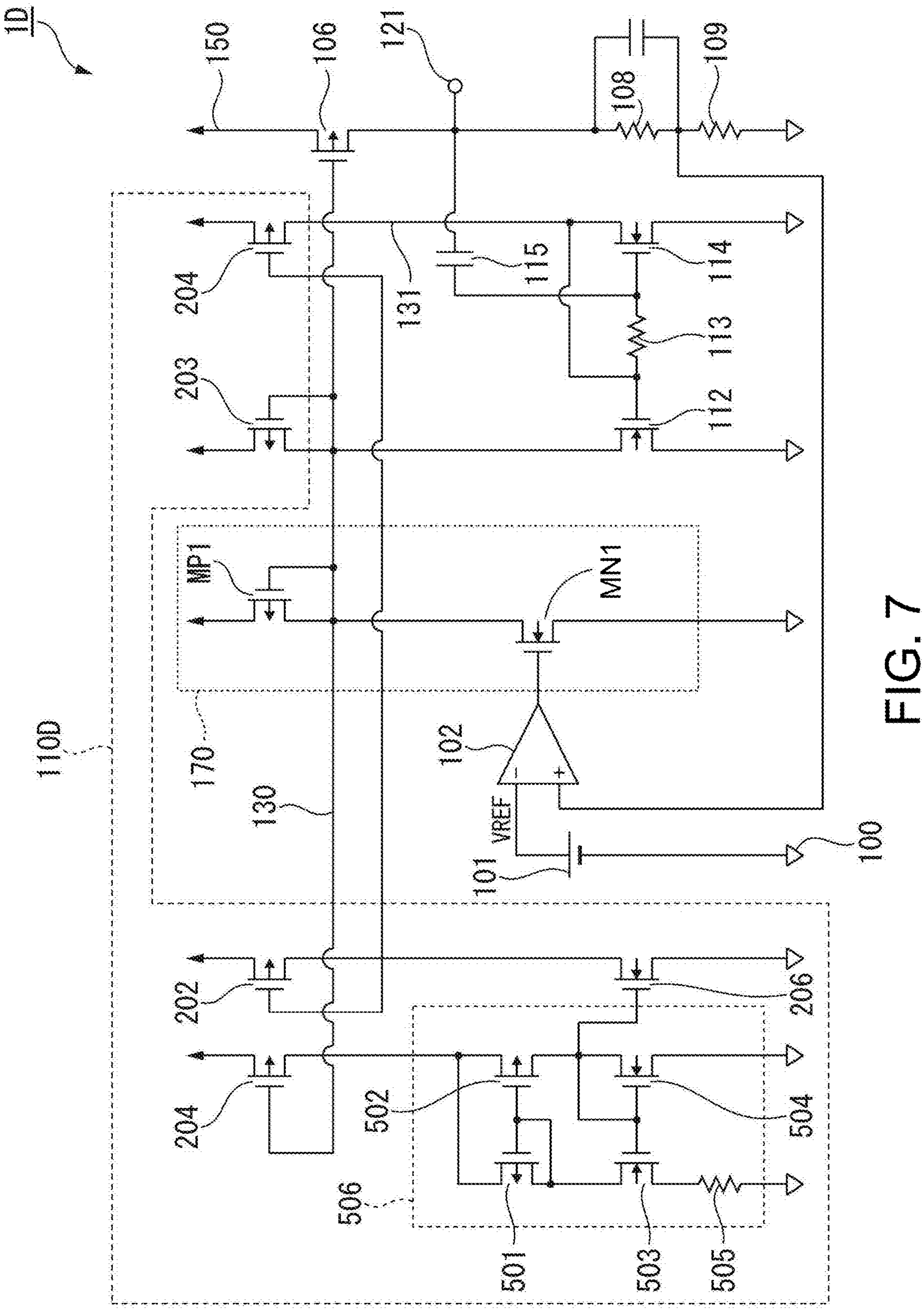
FIG. 7 is a circuit diagram showing a voltage regulator according to the fifth embodiment.

FIG. 7 is a circuit diagram showing a voltage regulator according to the fifth embodiment. Referring to this figure, an example of a voltage regulator 1D according to the fourth embodiment will be described. The voltage regulator 1D includes a current mirror circuit 110D instead of the current mirror circuit 110. Moreover, the current mirror circuit 110D according to the fifth embodiment may be applied to the voltage regulator 1 as described in the first embodiment, and may also be applied to the voltage regulator 1C including the inverting amplifier 170 as described in the fourth embodiment. The example shown in this figure is an example of application to the voltage regulator 1C including the inverting amplifier 170 as described in the fourth embodiment.

As shown in the figure, in the current mirror circuit 110D, the PMOS transistor 203 has its source connected to the power terminal, and its gate and drain connected to the gate of the PMOS transistor 106 and the drain of the NMOS transistor 112. In other words, the PMOS transistor 203 is diode-connected.

By diode-connecting the PMOS transistor 203, even in the case where the voltage at the gate terminal of the PMOS transistor 106 becomes close to the threshold voltage of the PMOS transistor 106, current from the power terminal 150 may be drawn by the current mirror circuit 110D. Therefore, the gain at the gate terminal of the PMOS transistor 106 may be lowered.

Here, according to conventional technology, in the case of reducing the electrostatic capacitance of the output capacitance, phase compensation may become difficult. Specifically, in the case of reducing the electrostatic capacitance of the output capacitance, a frequency $F_{P1}$ of the first pole generated by the output capacitance shifts to the wide-range side and approaches a frequency $F_{P2}$ of the second pole generated at the gate terminal of the PMOS transistor 106, causing a zero cross frequency $F_{ZC}$ to shift to the wide-range side, and the phase at the zero cross frequency $F_{ZC}$ approaches 0[°]. As a result, in the case of reducing the electrostatic capacitance of the output capacitance, phase compensation had become difficult.

According to this embodiment, since the gain at the gate terminal of the PMOS transistor 106 may be lowered, the frequency $F_{P2}$ of the second pole may be shifted to the wide-range side. As a result of the frequency $F_{P2}$ of the second pole shifting to the wide-range side, the frequency $F_{P1}$ of the first pole and the frequency $F_{P2}$ of the second pole may be sufficiently separated (the frequency bands may be separated). Therefore, according to this embodiment, even in the case of reducing the electrostatic capacitance of the output capacitance, phase compensation is possible without significantly increasing the circuit area.

Sixth Embodiment

Figure 8:
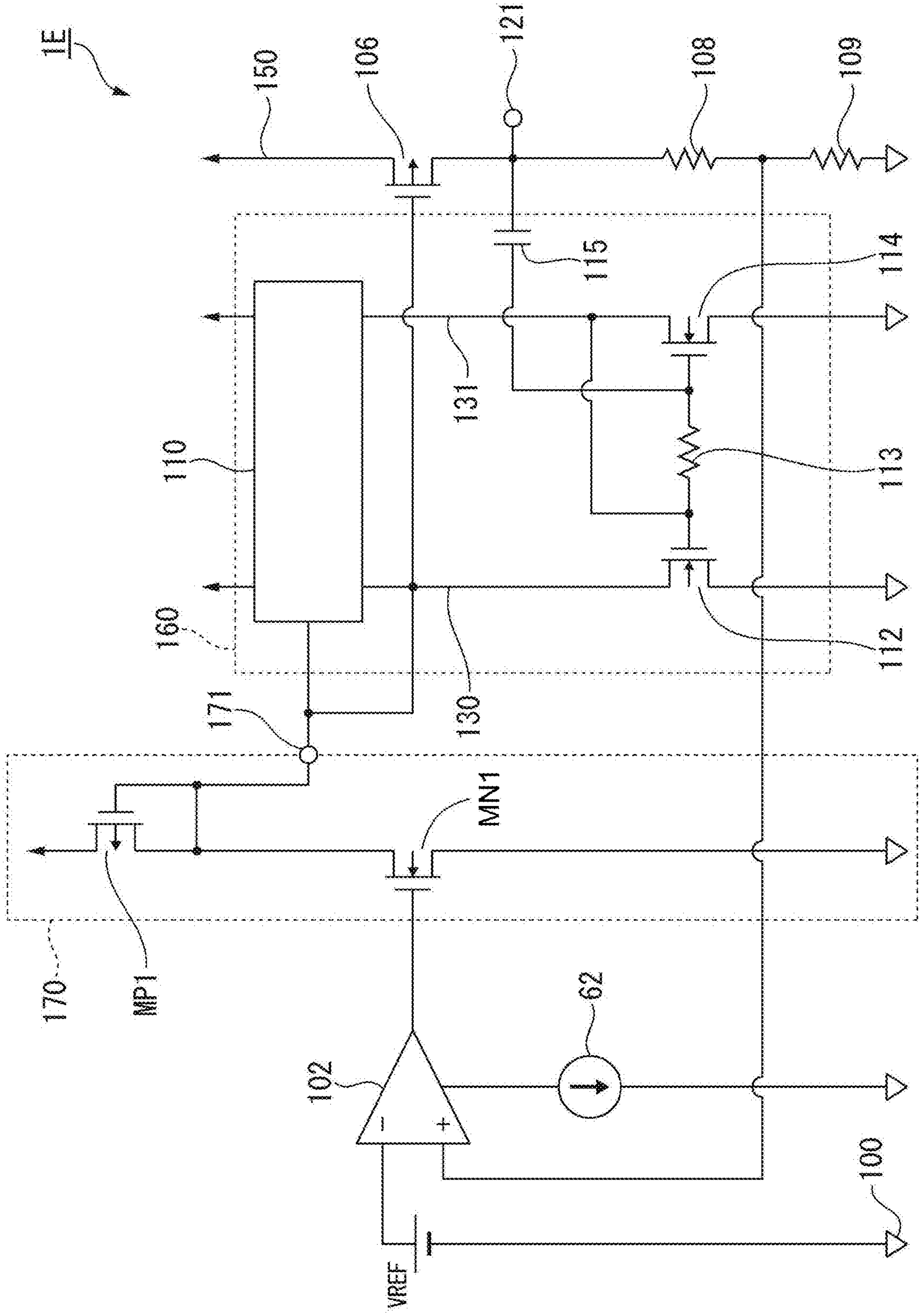
FIG. 8 is a circuit diagram showing a voltage regulator according to the sixth embodiment.

FIG. 8 is a circuit diagram showing a voltage regulator according to the sixth embodiment. Referring to this figure, an example of a voltage regulator 1E according to the sixth embodiment will be described. Based on the configuration of the voltage regulator 1C according to the fourth embodiment, the voltage regulator 1E according to the sixth embodiment further includes the bias current source 62 with positive temperature characteristics that the voltage regulator 1B according to the third embodiment possesses. The bias current source 62 is configured in the differential amplifier circuit 102. In the example shown in the figure, the differential amplifier circuit 102 includes a grounded negative power terminal, and the negative power terminal flows current with positive temperature characteristics to the ground point. As a specific aspect of the bias current source 62, known technology may be used. By further applying the bias current source 62 with positive temperature characteristics to the differential amplifier circuit 102, in the voltage regulator 1E including the inverting amplifier 170, even in the case where the load and power supply of the voltage regulator 1C fluctuate, the deterioration of response characteristics and phase margin due to temperature dependence can be suppressed.

Moreover, the voltage regulator 1, the voltage regulator 1A, the voltage regulator 1B, the voltage regulator 1C, the voltage regulator 1D or the voltage regulator 1E according to this embodiment may be realized as a predetermined semiconductor device. The semiconductor device may include at least the voltage regulator 1, the voltage regulator 1A, the voltage regulator 1B, the voltage regulator 1C, the voltage regulator 1D or the voltage regulator 1E. The semiconductor device may include, in addition to the voltage regulator 1, the voltage regulator 1A, the voltage regulator 1B, the voltage regulator 1C, the voltage regulator 1D or the voltage regulator 1E, a predetermined control circuit and peripheral circuits, etc.

The present invention has been described using embodiments for implementing the present invention, but specific aspects related to the present invention are not limited to these embodiments, and various modifications, substitutions, and design changes, etc. may be added within the scope that does not deviate from the essence of present invention.

Moreover, it is possible to implement combinations of the configurations described in each of the above-mentioned embodiments and the configurations described in each embodiment.

What is claimed is:

1. A voltage regulator, comprising:

a differential amplifier circuit that outputs to a gate of an output transistor a voltage amplified from a difference between a reference voltage and a divided voltage obtained by dividing a voltage output by the output transistor; and a phase compensation circuit, wherein the phase compensation circuit comprises:

a first transistor having a drain connected to an output port of the differential amplifier circuit, and having a drain-source current with a negative temperature characteristic due to temperature characteristics of carrier mobility;

a second transistor having a drain connected to a gate of the first transistor, having a gate connected to the gate of the first transistor via a resistor, and having a drain-source current with a negative temperature characteristic due to the temperature characteristics of carrier mobility; and a current mirror circuit that comprises a voltage detection transistor for detecting a voltage input to the gate of the output transistor, and that supplies a current with a positive temperature characteristic to the drain of the first transistor and the drain of the second transistor in response to a current flowing in the voltage detection transistor.

2. The voltage regulator according to claim 1, wherein the current mirror circuit comprises a constant current source circuit that limits a drive current value of the phase compensation circuit, and the constant current source circuit comprises:

a third transistor having a source connected to a drain of the voltage detection transistor, and having a gate connected to its own drain;

a fourth transistor having a source connected to the drain of the voltage detection transistor, and having a gate connected to the gate of the third transistor;

a fifth transistor having a drain connected to a drain of the fourth transistor, having a gate connected to its own drain, and having a source grounded;

a sixth transistor having a drain connected to the drain of the third transistor, and having a gate connected to the gate of the fifth transistor; and a first resistor having one end connected to a source of the sixth transistor, and having the other end grounded.

3. The voltage regulator according to claim 2, wherein the first resistor has a negative temperature characteristic.

4. A semiconductor device comprising the voltage regulator according to claim 3.

5. A semiconductor device comprising the voltage regulator according to claim 2.

6. The voltage regulator according to claim 1, wherein the differential amplifier circuit comprises a grounded negative power terminal, and the negative power terminal flows a current with a positive temperature characteristic to a ground point.

7. A semiconductor device comprising the voltage regulator according to claim 6.

8. A semiconductor device comprising the voltage regulator according to claim 1.

9. A voltage regulator, comprising:

a differential amplifier circuit that outputs to a gate of an output transistor a voltage amplified from a difference between a reference voltage and a divided voltage obtained by dividing a voltage output by the output transistor;

an inverting amplifier connected between the differential amplifier circuit and the output transistor; and a phase compensation circuit, wherein the phase compensation circuit comprises:

a first transistor having a drain connected to an output port of the inverting amplifier, and having a drain-source current with a negative temperature characteristic due to temperature characteristics of carrier mobility;

a second transistor having a drain connected to a gate of the first transistor, having a gate connected to the gate of the first transistor via a resistor, and having a drain-source current with a negative temperature characteristic due to the temperature characteristics of carrier mobility; and a current mirror circuit that comprises a voltage detection transistor for detecting a voltage input to the gate of the output transistor, and that supplies a current with a positive temperature characteristic to the drain of the first transistor and the drain of the second transistor in response to a current flowing in the voltage detection transistor.

10. The voltage regulator according to claim 9, wherein the current mirror circuit comprises:

a seventh transistor having a source connected to a power terminal, and having a gate and a drain connected to the gate of the first transistor and the drain of the second transistor.

11. A semiconductor device comprising the voltage regulator according to claim 10.

12. A semiconductor device comprising the voltage regulator according to claim 9.

* * * * *